June 27, 1950
H. C. INMAN
2,513,242
ELECTRIC FLUID HEATER
Filed Oct. 11, 1945
3 Sheets-Sheet 3
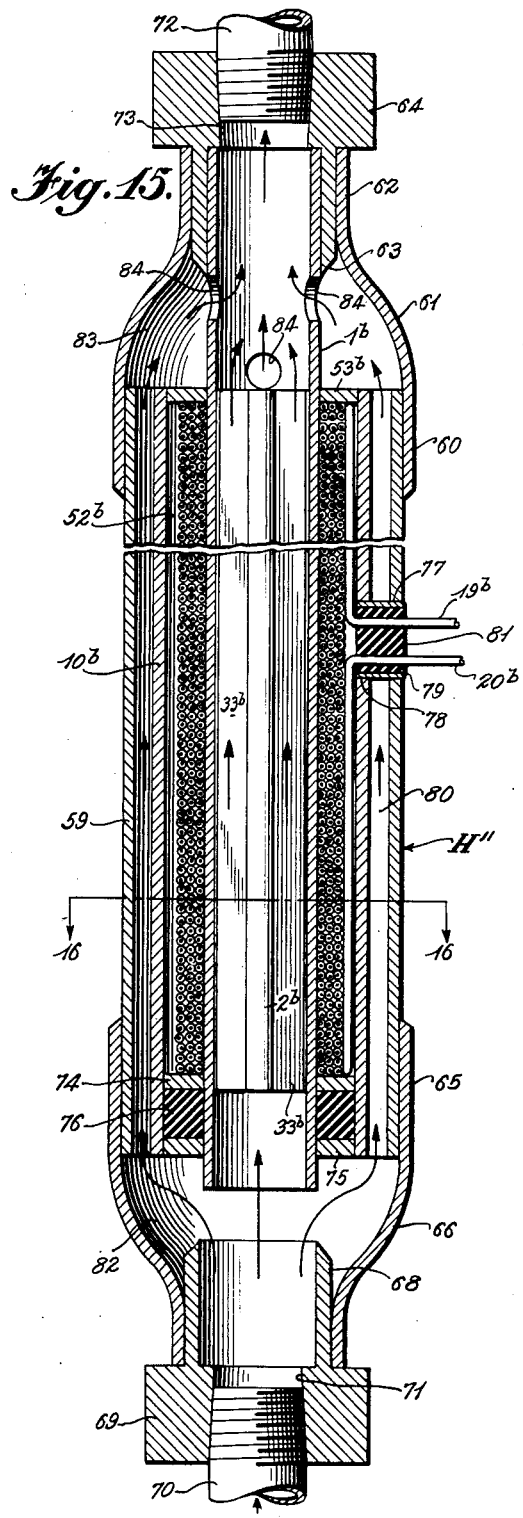
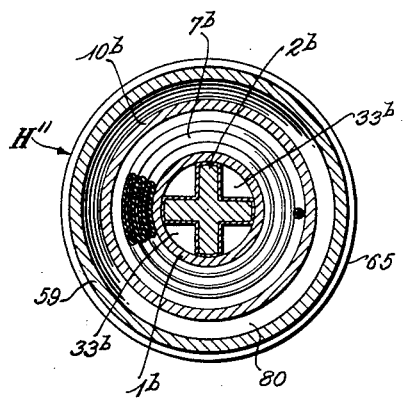
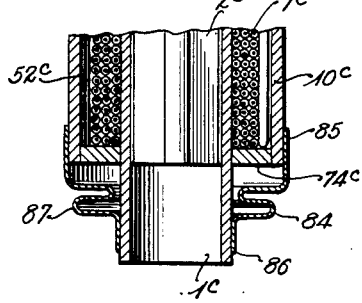
INVENTOR.
Hollis C. Inman
BY
Bacon + Thomas
ATTORNEYS Patented June 27, 1950

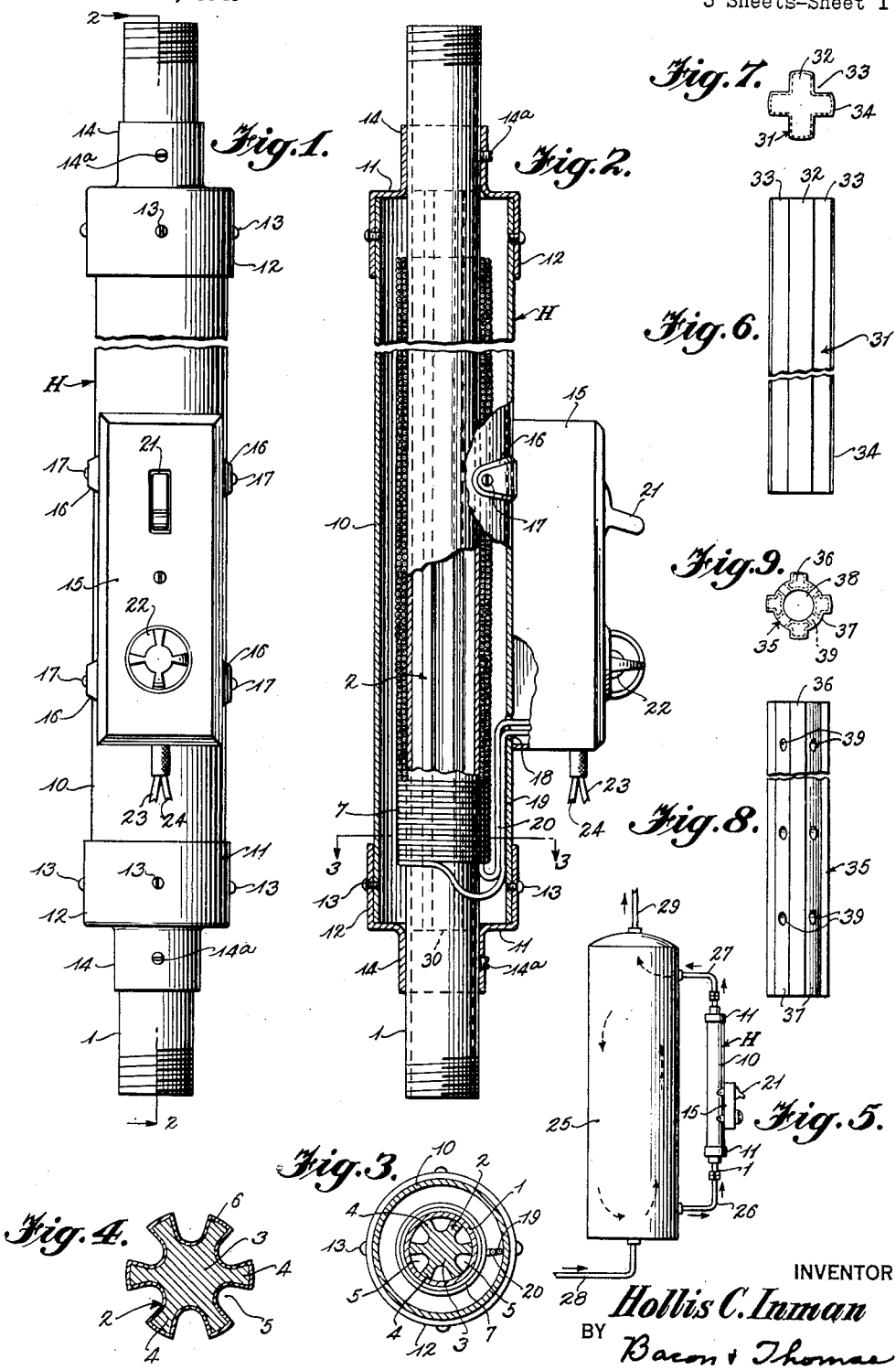

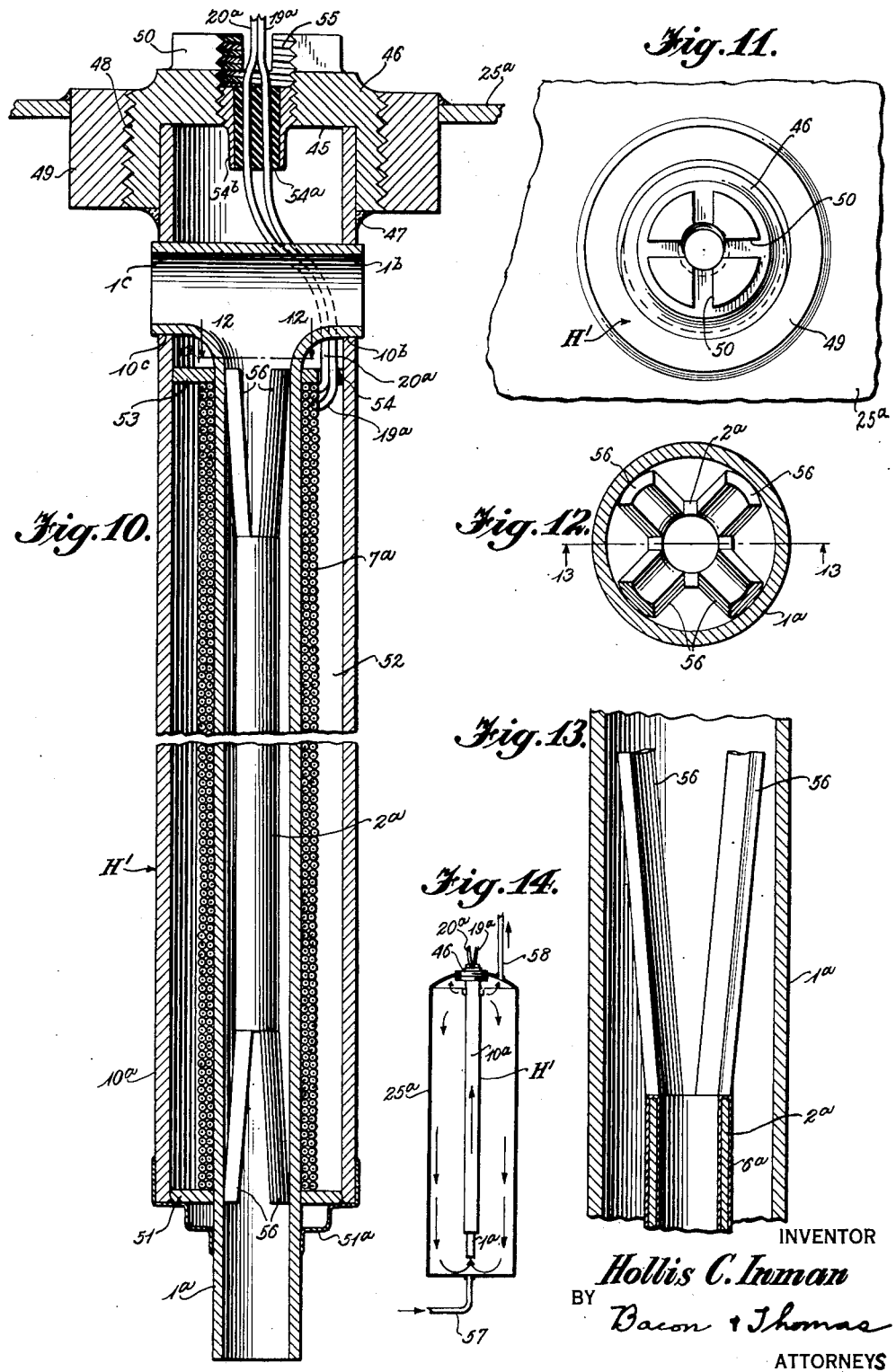

2,513,242

UNITED STATES PATENT OFFICE 2,513,242

ELECTRIC FLUID HEATER

Hollis C. Inman, Miami Beach, Fla.

Application October 11, 1945, Serial No. 621,740

8 Claims. (Cl. 219—47)

This invention relates to apparatus for heating fluid, either liquid or gas, for domestic or industrial uses.

More specifically, the invention relates to electric heating means of the induction type adapted to heat the fluid as it is passing therethrough.

The principal object of the invention is to provide heating means adapted to be connected in a pipe line to heat a liquid or gas as it is flowing therethrough or to be associated with a storage tank or boiler as a side arm heater or an immersion heater.

A more specific object of the invention is to provide an efficient and economical induction heating apparatus particularly adapted for heating water for domestic or industrial use.

Still another object of the invention is to provide liquid heating apparatus of the induction type which will quickly provide a supply of heated liquid without requiring the heating of a comparatively large body of the liquid, irrespective of whether said heating apparatus is connected with a storage tank or boiler.

Other objects and advantages of the invention will be apparent from the following description taken in conjunction with the accompanying drawings, in which:

Fig. 1 is an enlarged elevational view of one form of an induction type of heating unit embodying the principles of the present invention;

Fig. 2 is a view partly in section taken on the line 2—2 of Fig. 1;

Fig. 3 is a transverse sectional view taken on the line 3—3 of Fig. 2;

Fig. 4 is an enlarged transverse sectional view of the magnetic core of the heating unit shown in Figs. 1 to 3;

Fig. 5 is a diagrammatic view illustrating the manner in which the induction heating unit of Fig. 1 may be connected with a storage tank or boiler and serve as a side arm heater;

Fig. 6 is an elevational view of a modified form of magnetic core;

Fig. 7 is a plan view of the magnetic core shown in Fig. 6;

Fig. 8 is an elevational view of another form of magnetic core;

Fig. 9 is a plan view of the magnetic core shown in Fig. 8;

Fig. 10 is an enlarged vertical sectional view through an immersion type of induction heating device embodying the principles of the invention;

Fig. 11 is a fragmentary plan view of the device shown in Fig. 10;

Fig. 12 is an enlarged sectional view taken on the line 12—12 of Fig. 10;

Fig. 13 is a sectional view taken on the line 13—13 of Fig. 12;

Fig. 14 is a view diagrammatically illustrating a liquid storage tank or boiler having the immersion type of induction heater shown in Fig. 10 installed therein;

Fig. 15 is a longitudinal sectional view of a modified form of heater;

Fig. 16 is a sectional view taken on the line 16—16 of Fig. 15; and

Fig. 17 is a fragmentary sectional view illustrating a form of expansion joint that may be employed in the heating units shown in Figs. 10 and 15.

Referring now to Figs. 1 to 4, inclusive, the fluid heating unit is generally identified by the letter H and comprises a non-magnetic tube or duct 1, preferably copper, containing a fluted iron or magnetic core 2. The magnetic core 2 consists of a body 3 which is solid transversely, as best illustrated in Figs. 3 and 4, but which is provided on its exterior surface with a plurality of longitudinaly extending ridges 4 with a flute or groove 5 disposed between each two adjacent ridges. Preferably, the entire surface of the magnetic core 2 is coated or plated with a thin layer of copper 6. The plated magnetic core 2 fits tightly within the copper tube 1 with the plated surface of the crown of the ridges 4 in intimate contact with the inner surface of said copper tube. The copper tube 1 and the copper coating 6 on the magnetic core 2 serve as the secondary of the induction heating unit H. Inasmuch as the tube 1 is preferably made of copper, and the magnetic core 2 is coated with a layer of copper 6, the fluid which passes through the passageways provided by the flutes 5 contacts only with non-magnetic metal.

The non-magnetic tube 1 has a coil 7 of insulated resistance wire wound directly upon the exterior thereof and said coil serves as the primary winding of the induction heater. The wire of the primary winding 7 is very fine, preferably 20 gauge or .035" in diameter. Any suitable insulation may be applied to the wire of the primary winding 7, but very satisfactory results have been obtained by using glass insulation of a thickness of about .002" which will withstand temperatures as high as 1000° F. While glass insulation is mentioned as preferred, it will be understood that any insulation capable of satisfactorily withstanding the high temperatures involved may be employed.

The primary winding 7 is surrounded by a ferrous or magnetic cylindrical casing or shell 10 which is arranged concentrically with respect to the non-magnetic tube 1 and is maintained in such relationship by iron cap members 11 disposed at the opposite ends thereof. Each of the cap members 11 includes a flanged portion 12 which telescopes over the adjacent end of the iron shell 10 and is secured thereto by a plurality of screws 13. Each of the cap members 11 also includes a reduced neck portion 14 which fits snugly about the non-magnetic tube 1 and may be secured thereto by any suitable means, such as a set screw 14a.

A hollow switch box 15 is provided with a plurality of rearwardly extending tabs 16 which partially embrace the shell 10 and are secured to said shell by screws 17. The shell 10 has an opening 18 (Fig. 2) through which the leads 19 and 20 of the primary winding 7 extend for connection with a conventional switch 21 mounted in the switch box 15 for controlling the supply of current to the primary winding 7. The switch box 15 is also provided with a conventional pilot light 22 which is illuminated whenever the circuit to the primary winding 7 is closed. Current is supplied to the switch box 15 through leads 23 and 24.

The opposite ends of the non-magnetic tube 1 are threaded as indicated in the drawings to facilitate coupling of the heating unit H in a pipe line (not shown) for heating the fluid flowing through said pipe line.

Alternatively, the heating unit H may also be connected with a liquid storage tank 25 (Fig. 5) for example, by a ferrous pipe 26 having one end thereof connected with the lower end of the non-magnetic tube 1 and its opposite end connected with an outlet adjacent the lower end of the tank 25. The upper end of the non-magnetic tube 1 is connected by a ferrous pipe 27 with an inlet adjacent the upper end of the tank 25. Water or other liquid to be heated is introduced into the tank 25 through a supply pipe 28 connected at one end with a source of supply and at its opposite end with the bottom of said tank. A service pipe 29 has one end thereof connected to the top of the tank 25.

While the winding 7 has been referred to as the primary winding of the induction heating unit H, the secondary "winding" is formed by the copper tube 1, which preferably is made as thin as practicable to facilitate heat transfer. As has been previously pointed out, the copper plating on the core 2 also serves as a portion of the secondary "winding" of the heating unit. The magnetic core 2 is made of such length that its ends terminate at a point marked 30 (Fig. 2) in the zone of the cap members 11. The cap members 11 and the shell 10 of the casing which encloses the primary winding 7 are preferably made of iron or other ferrous metal and provide a closed path for the magnetic flux created when the primary winding 7 is energized. Thus, the shell 10 and cap pieces 11 in effect serve as an outer magnetic core for the induction heater.

In accordance with the principles of the invention, and irrespective of whether the heating unit 8 is connected in a pipe line or with a storage tank, the liquid to be heated passes between the magnetic core 2 and the non-magnetic tube 1 through the several channels provided by the flutes 5. The surfaces contacted by the liquid, as has been previously pointed out, are non-magnetic. The iron core 2 is magnetic. Hence, the non-magnetic tube 1, and the core surfaces 6 defining the flutes 5 become the short-circuited secondary of the transformer heater. The induced electrical currents flowing in the short-circuited secondary result in the creation of a high heat which is transmitted to the liquid. Additional heat for heating the liquid is caused by hysteresis and eddy currents within the magnetic core 2.

A closed magnetic circuit for the transformer is provided by the inner fluted magnetic core 2 and the outer magnetic or ferrous casing 11—10—11.

The primary winding 7 is energized by alternating current, and high induced, short-circuited currents are set up in said tube, and in the non-ferrous or non-magnetic surfaces provided by the plating 6 on the flutes. These short-circuited currents create high temperatures and the liquid becomes heated through direct contact with the heated tube 1 and the planted surfaces of the flutes 5. Furthermore, additional indirect heat is derived from the glass insulated primary winding 7, which heat results from the resistance to the flow of electrical current offered by the wire of the primary winding 7. The heat created especially by the secondary winding is such that insulation capable of withstanding high temperatures must be employed.

As will be apparent from the foregoing, the magnetic circuit is a closed circuit consisting of the inner magnetic core 2 and the outer magnetic core or casing 11—10—11. The magnetic flux created by the primary winding 7 cuts the short-circuited secondary 1 and passes into the magnetic core 2 and along said core to the point 30 at one end thereof, and thence through one of the cap members 11, the shell 10 and then back to the opposite end of the magnetic core 2 through the other cap member 11. A high power factor is obtained by having the crown of the ridges 4 fit tightly against the inner surface of the non-magnetic tube 1.

Any leakage flux entering the flutes 5 is trapped and will pass through the non-magnetic copper plating 6 on the surfaces of the core 2 creating additional heat that is directly absorbed by the liquid passing thriugh the flutes 5. This provides for very economical heating of the liquid without energy waste.

When the heater H is used as a side arm heater, the flow of liquid is upward through said heater as indicated by the arrows. Thus, the heated liquid is delivered to the upper end of the tank 25 where it is available for immediate withdrawal through the service pipe 29. Consequently, hot liquid is made available without requiring the entire contents of the tank 25 to be heated. If a greater volume of liquid is heated than withdrawn, the liquid will circulate in the tank 25 in the manner indicated by the arrows.

Figs. 6 and 7 illustrate a modified form of iron or magnetic core 31 that may be used in lieu of the magnetic core 2 previously described. The core 31 comprises four ridges 32, instead of six, forming a corresponding number of flutes 33 therebetween. The magnetic core 31 is also preferably provided with a non-magnetic coating or copper plating 34.

Figs. 8 and 9 illustrate another form of copper plated magnetic core 35 that may be used in lieu of either of the magnetic cores previously described. The core 35 includes four ridges or ribs 36 providing an equal number of flutes 37. The magnetic core 35 is distinguished by a central passageway 38 extending longitudinally therethrough from end to end. The passageway 38 communicates with the flutes 37 through a plurality of vertically spaced openings 39. The purpose of the central passageway 38 and the spaced openings 39 is to promote circulation of the liquid as it passes along the core 35.

It has been found by experiment that reducing the cross-sectional area of the magnetic core by slots, holes, or other means, increases the amperage input of the heater. The explanation is that when the core cross-section is reduced, the reluctance of the magnetic circuit is increased, which results in the reduction of the impedance of the primary winding 7 and an increase in flow of current in the primary winding. Thus, the same constitutes a method of controlling the input wattage of a given heater and this is of importance in commercial manufacture.

Referring now to Figs. 10-14, the letter H' generally identifies an immersion type of induction heating unit. As is here shown, the heater H' includes an outer iron or ferrous cylindrical shell or casing 10a, the upper end of which is received in a recess 45 formed in a plug 46. The casing 10a may be secured to the plug in any suitable manner, for example, by welding as indicated at 47. The plug 46 is externally threaded and is mounted in a threaded opening 48 formed in a bushing 49 welded into the top of a boiler or liquid storage tank 25a. Intersecting slots 50 are provided in the head of the plug for engagement by a wrench (not shown) for aiding in attaching and detaching the heater H' from the tank 25a.

A non-magnetic tube or duct 1a, preferably copper, is disposed in the casing 10a and is arranged so that it projects to a point below the lower end of the casing 10a. An annular iron centering ring 51 is disposed between the non-magnetic tube 1a and the magnetic casing 10a and is suitably bonded to said casing, but has a sliding fit with said non-magnetic tube. A flexible copper sleeve 51a is welded or otherwise secured at its opposite ends in fluid-tight engagement with the casing 10a and tube 1a, respectively. The ring 51 and sleeve 51a thus cooperate to provide an expansion joint which compensates for the differential expansion of the ferrous casing 10a and the copper tube 1a, and at the same time maintains a seal which prevents access of liquid into a chamber 52 above the ring 51 between the non-magnetic tube 1a and the magnetic casing 10a.

The upper end of the non-magnetic tube 1a is preferably branched as illustrated in Fig. 10 to provide portions 1b and 1c which project outwardly through openings 10b and 10c formed in the casing 10a. The portions 1b and 1c are in intimate contact with the walls defining the openings 10b and 10c and a liquid-tight seal at the points of contact may be insured by soldering or otherwise to prevent the entrance of water into the chamber 52. A second annular ring 53, generally similar to the ring 51, is interposed between the non-magnetic tube 1a and the casing 10a at a point just below the openings 10b and 10c.

A primary winding 7a consisting of at least two layers of glass-insulated wire similar to that employed in the primary winding 7 is wound around the tube 1a and disposed in the chamber 52 between the rings 51 and 53. Leads 19a and 20a of the primary winding 7a extend through an opening 54 in the ring 53, thence around the branched portion 1b of the casing 10a and through a rubber core 54a disposed in a tube 54b mounted in a threaded opening 55 formed in the mounting plug 46. The leads 19a and 20a are connected with a switch box (not shown) similar to the box 15 for controlling the supply of current to the primary winding 7a.

The rubber core 54a forms a seal for preventing room air from entering the coil chamber 52. The rubber core 54a prevents abrasion of the leads 19a and 20a at the point where they leave the casing 10a, and also serves the very important purpose of preventing short-circuiting of the coil winding which would otherwise result from a condensation of the moisture within the casing 10a. In connection with the latter, if the chamber 52 were open to the atmosphere, and with the upper portion of the heater H' hot and the lower portion cold, air would be induced to flow toward the bottom of the chamber 52 where it would become heated and rise upwardly along the surface of the coil 7a and the moisture in the air would collect at the top of the chamber until the dew point was reached and then condense. The condensate would eventually impregnate the insulation on the winding and short-circuit the coil 7a. By thus excluding air from the casing 10a, moisture is prevented from condensing in the coil chamber 52 and the life of the coil 7a is prolonged indefinitely.

In Fig. 10, the inner magnetic core of the heater H' is shown as consisting of a length of iron or magnetic tubing 2a which is preferably copper plated as indicated at 6a in Fig. 13. The magnetic core 2a is of smaller external diameter than the internal diameter of the non-magnetic tube 1a. The opposite ends of the magnetic tube 2a are slotted to provide four fingers 56 which are spread apart, or diverge outwardly, into tight engagement with the inner surface of the non-magnetic tube 1a. The overall length of the tubular core 2a is such that the ends of the upper fingers 56 are disposed in substantially the same plane or zone as the ring 53 and the ends of the fingers at the lower end of said tube are disposed in substantially the same horizontal plane as the ring 51. Thus, a closed magnetic circuit is provided by the core 2a, the rings 51 and 53 and the outer core or casing 10a.

The length of the non-magnetic tube 1a is preferably such that it terminates a short distance above the bottom of the storage tank 25a (see Fig. 14). Water or other liquid to be heated by the immersion heater H' is introduced into the bottom of the tank 25a through a supply pipe 57 and heated water is withdrawn from said tank through a service pipe 58.

The induction heater H' operates on the same principles as the induction heater H previously described. The water to be heated circulates upwardly through the heater H' in the space between the non-magnetic tube 1a and the tubular metallic core 2a and also through the passageway in said tubular core and then flows outwardly through the branched portions 1b and 1c at the upper end of the core 2a. Thus, the heated liquid is delivered to the upper end of the tank 25a at a point close to the inlet of the service pipe 58 so that heated liquid is immediately available for withdrawal through said service pipe without requiring the entire contents of the tank 25a to be heated. However, it will be understood that when the heater H' is in operation, and little or no water is being withdrawn through the service pipe 58, the entire contents of the tank 25ª will be heated by gravity circulation of the liquid in said tank as indicated by the arrows.

Figs. 15 and 16 illustrate a modified form of heater H'', which provides greater efficiency and economy than the heater shown in Figs. 1 to 5, inclusive. The heater H'' includes an elongated cylindrical steel housing 59 having the large end 60 of a steel reducer coupling 61 secured to the upper end thereof. The small end 62 of the coupling 61 surrounds and is secured to a cylindrical skirt 63 depending from a ferrous fitting 64. The lower end of the housing 59 is connected to the large end 65 of a similar coupling 66 and the small end 67 of said coupling surrounds and is secured to a skirt 68 projecting upwardly from a ferrous fitting 69. A ferrous inlet pipe 70 is threaded into an opening 71 in the fitting 69 and a ferrous outlet pipe 72 is threaded into an opening 73 in the fitting 64.

A copper tube or duct $1^b$ is arranged concentrically within the housing 59 and its upper end is received within and secured to the skirt 63 of the fitting 64. The tube $1^b$ extends downwardly through the housing 59 and its lower end terminates short of the upper end of the sleeve 68 of the lower fitting 69. A copper-plated magnetic core $2^b$, similar to the core 31, is mounted in the tube $1^b$, providing four flutes or passageways $33^b$ for fluid in said tube.

A ferrous casing $10^b$, substantially of the same length as the housing 59, is arranged concentrically between said housing and the tube $1^b$. An annular ferrous ring $53^b$ is mounted in the upper end of the casing $10^b$ and is welded in fluid-tight relation to both said casing and the tube $1^b$. A pair of vertically spaced ferrous rings 74 and 75 is disposed at the lower end of the casing $10^b$. The outer periphery of the rings 74 and 75 is welded or otherwise secured to the inner surface of the casing $10^b$ and the inner periphery of said rings has a sliding fit with the outer periphery of the tube $1^b$. A rubber sealing ring 76 is mounted in the space between the rings 74 and 75 and forms a fluid-tight seal between the casing $10^b$ and the tube $1^b$, thus preventing all fluid from entering the space $52^b$ between the rings $53^b$ and 74. In addition, the rings 74 and 75 and the sealing ring 76 provide an expansion joint which accommodates the differential thermal expansion of the ferrous casing $10^b$ and the copper tube $1^b$.

The chamber $52^b$ contains the primary winding $7^b$ of a transformer which may consist of a greater number of layers of insulated wire than employed in the coils 7 or $7^a$. Such increase in the number of layers of the coil $7^b$ is made possible by the fact that the housing 59, the couplings 61 and 66, and the fittings 64 and 69 provide a water jacket for absorbing additional heat from the coil, as will appear more fully hereinafter.

The housing 59 has an opening 77 extending through the side wall thereof and the casing $10^a$ has a similar opening 78 aligned therewith. A ferrous tube 79 is mounted in fluid-tight engagement with the openings 77 and 78 and bridges the water jacket space 80 between the housing 59 and casing $10^b$. A rubber core 81 is mounted in the tube 79 and the leads $19^b$ and $20^b$ of the coil or winding $7^b$ extend through said rubber core for connection with a suitable source of electric current. The rubber core 81 seals the chamber $52^b$ from the atmosphere and thus prevents air from carrying moisture into said chamber, with the result that short-circuiting of the coil $7^b$ is prevented in the same manner set forth in connection with the coil $7^a$ of Fig. 10.

The space 80 between the casing $10^a$ and the housing 59 is, of course, annular and provides a concentric duct which communicates at its lower end with a diffusion chamber 82 in the flared portion of the coupling 66, and at its upper end with a chamber 83 in the coupling 61, which chamber assists in inducing siphonic flow of liquid upwardly in said annular duct, as will be explained more fully hereinafter. The copper tube $1^b$ has a plurality of openings 84 formed therein in the portion thereof disposed between the ring $53^b$ and the skirt 63 for establishing communication between the chamber 83 and the interior of said tube.

The heater H'' may be connected in a pipe line including the pipes 70 and 72 to heat the liquid as it passes through said line. The heater H'' operates on the same principles as the heater H previously described, although the liquid circulation through the heater H'' is somewhat different because of the water jacket 59—80. Thus, in operation, the water or other liquid to be heated is introduced into the heater H'' through the pipe 70, said water entering the diffusion chamber 82 and flowing upwardly in the copper tube $1^b$ through the core channels $33^b$. The water also passes from the chamber 82 into the jacket space 80 in the housing 59. The water is progressively heated by the coil $7^b$ in the same manner described in connection with Figs. 1 to 5, except that heat is also transferred from the casing $10^b$ to the fluid in the jacket space 80, instead of being lost by radiation to the atmosphere. Thus, the greater amount of the heat produced by the coil $7^b$ is substantially all absorbed by the water and the efficiency of the unit is increased as much as 30%. The heated water flows upwardly in the tube $1^b$ and in the jacket space 80 as indicated by the arrows in Fig. 15. The heated water from the space 80 enters the chamber 83 and flows therefrom through the openings 84 into the tube $1^b$; mixes with the heated water in the tube $1^b$ and passes from the heater H'' through the outlet pipe 72.

The provision of the water jacket 59—80 in the heater H'' makes it possible to satisfactorily employ the rubber packing ring 76 and the rubber core 81 because the lower or inlet portion of said heating device remains comparatively cool.

It will also be understood that the heater H'', may be connected with a storage tank and serve as a side arm heater by connecting the pipes 70 and 72 with the lower and upper ends, respectively, of a conventional water boiler (not shown). It will be apparent that, in such event, the heated water will collect in the upper portion of the boiler and will be immediately available for withdrawal, in the same manner described in connection with the side arm heater shown in Fig. 5. The circulation of the water in the boiler is also similar. However, the natural circulation in the heater H'' itself is different due to the presence of the water jacket 59—80. Thus, while heated water is continuously delivered to the upper part of the boiler (not shown) circulation is induced in the jacket space or concentric duct 80 by siphonic action, the relatively rapid flow of heated water through the central tube or duct $1^b$ effecting an ejector action in the zone of the openings 84 and drawing water from the chamber 83 along with it. In this manner, a positive circulation of water is maintained through the jacket space 80, and the heat at the outer portion of the coil 7b is transferred to the water from the casing 10b by conduction, thereby substantially increasing its B. t. u. content.

Fig. 17 illustrates an expansion joint that may be employed in the heating devices shown in Figs. 10 and 15. As here illustrated, a copper tube 1c containing a copper-plated magnetic core 2c is surrounded at its lower end by a casing 10c containing a primary winding 7c of a transformer coil. An annular iron ring 74c is welded at its outer periphery to the casing 10c, but has a free sliding fit at its inner periphery with the exterior of the copper tube 1c. A flexible bellows or Sylphon member 84 has one end 85 thereof welded or otherwise secured to the casing 10c and its opposite end 86 similarly secured to the adjacent end of the tube 1c. The member 84 is provided with one or more corrugations 87 which permit the same to contract and elongate in a direction longitudinally of the casing 10c and the tube 1c to maintain a tight seal preventing liquid from entering the coil chamber 52c and at the same time compensate for the differential expansion of the ferrous casing 10c and the copper tube 1c.

It will be understood that the length of the magnetic core and the length of the primary winding of the induction heating apparatus described herein, may be varied as desired to provide fluid of any temperature necessary to meet the requirements of a given installation. It will also be understood that the apparatus is operative without a non-magnetic coating on the core, but that such device is less efficient and hence a plated inner core is preferred.

It will be further understood that the circuit to the primary winding may be maintained closed by the control switch and the supply of current to the primary winding varied to provide fluid at a given temperature, under the control of a conventional thermostat operated switch (not shown).

It will be still further understood that the copper surfaces in contact with the heated water will reduce or eliminate the deposit of solids thereon from the water, thus maintaining an unrestricted flow or circulation of water through the heating apparatus at all times.

While three forms of induction or transformer heaters have been disclosed herein, it will be understood that various changes may be made in the details of construction and arrangement of the parts thereof, without departing from the spirit of the invention or the scope of the annexed claims.

I claim:

1. An induction heater, comprising: an elongated magnetic core having a fluted exterior; a coating of non-magnetic metal on the exterior of said magnetic core; a non-magnetic tube surrounding said magnetic core and having the interior surface thereof in intimate contact wtih the non-magnetic coating on the portions of said magnetic core between the flutes; a primary winding on the exterior of said non-magnetic tube; and a ferrous casing surrounding said primary winding.

2. An induction heater, comprising: an elongated magnetic core having a fluted exterior; a coating of copper on the exterior surface of said magnetic core; a copper tube surrounding said magnetic core and having the interior surface thereof in intimate contact with the copper coating on the portions of said magnetic core between the flutes; a primary winding on the exterior of said copper tube; and a ferrous casing enclosing said primary winding.

3. An induction heater, comprising: a copper tube; an iron core within said copper tube, said iron core comprising a length of tubing of smaller external diameter than the internal diameter of said copper tube and provided with a plurality of outwardly extending fingers at the opposite ends thereof; a plating of copper on said iron core, said fingers including portions in intimate contact with the interior surfaces of said copper tube; a primary winding on the exterior of said copper tube; and an iron casing surrounding said primary winding.

4. An induction heater, comprising: a magnetic core having a plurality of longitudinally extending, circumferentially spaced ridges formed thereon providing a flute between each two adjacent ridges; a plating of copper completely encasing said magnetic core; a copper tube of greater length than said magnetic core surrounding said magnetic core and having the interior surface thereof in intimate contact with the copper plating on the crown of the ridges of said magnetic core; a primary winding on the exterior of said copper tube; a ferrous metal casing surrounding said copper tube and enclosing said primary winding, said casing having an opening through which the leads of said primary winding extend; and a switch mounted upon the exterior of said casing and connected with said leads for controlling the supply of current to said primary winding.

5. An induction heater of the immersion type, comprising: an elongated ferrous metal casing; means secured to said casing for mounting the same in a fluid storage tank, said casing having a pair of openings extending therethrough adjacent the upper end thereof; a non-magnetic tube concentrically mounted in said casing, the upper end of said non-magnetic tube being branched and including portions extending through said openings in said casing and being in intimate contact with the walls defining said openings, the lower end of said non-magnetic tube projecting through the lower end of said casing; means forming a fluid-tight seal between the lower end of said casing and said non-magnetic tube; a primary winding surrounding said non-magnetic tube and disposed within said casing between said seal and the branched upper end of said non-magnetic tube; and a magnetic core disposed within said non-magnetic tube, said magnetic core including portions spaced from the inner surface of said non-magnetic tube to provide passage means for the flow of fluid through said non-magnetic tube.

6. An induction heater of the immersion type, comprising: an elongated ferrous metal casing; means secured to one end of said casing for mounting the same in the upper end of a liquid storage tank, said casing having a pair of openings extending therethrough adjacent the upper end thereof; a non-magnetic tube concentrically mounted in said casing, the upper end of said non-magnetic tube being branched and including portions extending through said openings in said casing and being in liquid-tight contact with the walls defining said openings; the lower end of said non-magnetic tube projecting through the lower end of said casing; means forming a liquid-tight seal between the lower end of said casing and said non-magnetic tube; a primary winding surrounding said non-magnetic tube and disposed within said casing between said liquid-tight seal and the branched upper end of said non-magnetic tube; and a magnetic core disposed within said non-magnetic tube, said magnetic core being tubular and including portions spaced from the inner surface of said non-magnetic tube to provide passage means for the flow of liquid through said non-magnetic tube.

7. Liquid heating apparatus, comprising: an immersion type liquid heater, said liquid heater including an elongated ferrous casing; means secured to the upper end of said casing for mounting the same in an opening of a storage tank, said casing having openings formed therein adjacent the upper end thereof; a non-magnetic tube disposed in said casing, said non-magnetic tube being branched at its upper end and including portions extending through said openings in said casing and being in intimate contact with the walls defining said openings, the lower end of said non-magnetic tube projecting beyond the lower extremity of said casing; means at the lower extremity of said casing forming a liquid-tight seal between said casing and the lower end of said non-magnetic tube; a primary winding surrounding said non-magnetic tube and disposed between said seal-forming means and the branched portion of said non-magnetic tube; and a magnetic core disposed in said non-magnetic tube, said magnetic core comprising a length of tubing of a smaller external diameter than the internal diameter of said non-magnetic tube and provided at its opposite ends with a plurality of outwardly diverging fingers, the extremities of which are arranged in intimate contact with the interior surface of said non-magnetic tube, whereby to permit the passage of the liquid to be heated upwardly through the annular space between said magnetic core and said non-magnetic tube, as well as through said non-magnetic core, for discharge through the branched portion of said non-magnetic tube.

8. A liquid heater, comprising: a non-magnetic tube; an iron core arranged concentrically within said non-magnetic tube, said iron core including portions spaced from the inner surface of said non-magnetic tube to permit passage of the fluid to be heated between said iron core and the inner surface of said non-magnetic tube; a primary winding on the exterior of said non-magnetic tube; a magnetic casing surrounding and enclosing said primary winding; an expansion joint between said magnetic casing and said non-magnetic tube to compensate for the differential expansion of said casing and tube; and a housing enclosing said magnetic casing and non-magnetic tube and providing a jacket around said casing for absorbing the heat transferred through said casing.

HOLLIS C. INMAN.

REFERENCES CITED

The following references are of record in the file of this patent:

UNITED STATES PATENTS

| Number | Name | Date |
|---|---|---|
| 500,520 | Wetmore | June 27, 1893 |
| 978,808 | Ayer | Dec. 13, 1910 |
| 1,193,404 | Ludwick | Aug. 1, 1916 |
| 1,260,564 | Magnusson et al. | Mar. 26, 1918 |
| 1,273,389 | Ludwick | July 23, 1918 |
| 1,322,416 | Fossati | Nov. 18, 1919 |
| 1,362,622 | Hendricks | Dec. 21, 1920 |
| 1,375,084 | Cox | Apr. 19, 1921 |
| 1,515,729 | Clement | Nov. 28, 1924 |
| 1,551,766 | Northrup | Sept. 1, 1925 |
| 1,780,426 | Hyde | Nov. 4, 1930 |
| 1,981,632 | Northrup | Nov. 20, 1934 |
| 2,218,999 | White | Oct. 22, 1940 |
| 2,302,774 | Jarvis | Nov. 24, 1942 |
| 2,407,562 | Lofgren | Sept. 10, 1946 |
| 2,462,746 | Inman | Feb. 22, 1949 |

FOREIGN PATENTS

| Number | Country | Date |
|---|---|---|
| 14,884 | Great Britain | July 19, 1905 |
| 504,880 | Great Britain | May 2, 1939 |